United States Patent
Chang et al.

(10) Patent No.: US 9,526,108 B2
(45) Date of Patent: Dec. 20, 2016

(54) APPARATUS AND METHOD FOR MITIGATION/REMOVAL OF INTERFERENCE BETWEEN MACRO-CELL AND FEMTO-CELL

(71) Applicant: INTELLECTUAL DISCOVERY CO., LTD., Seoul (KR)

(72) Inventors: Kyung Hi Chang, Seoul (KR); Cheng Chao Liang, Incheon (KR)

(73) Assignee: INTELLECTUAL DISCOVERY CO., LTD., Seoul (KR)

(*) Notice: Subject to any disclaimer, the term of this patent is extended or adjusted under 35 U.S.C. 154(b) by 58 days.

(21) Appl. No.: 14/582,771

(22) Filed: Dec. 24, 2014

(65) Prior Publication Data
US 2015/0111592 A1 Apr. 23, 2015

Related U.S. Application Data

(63) Continuation of application No. PCT/KR2013/005820, filed on Jul. 1, 2013.

(30) Foreign Application Priority Data

Jun. 29, 2012 (KR) .................. 10-2012-0071390

(51) Int. Cl.
*H04W 72/00* (2009.01)
*H04W 72/08* (2009.01)
(Continued)

(52) U.S. Cl.
CPC ........... *H04W 72/082* (2013.01); *H04W 16/10* (2013.01); *H04W 84/045* (2013.01)

(58) Field of Classification Search
CPC .. H04W 72/082; H04W 24/10; H04W 84/045; H04W 16/10; H04W 72/04
See application file for complete search history.

(56) References Cited

U.S. PATENT DOCUMENTS

2012/0046028 A1  2/2012  Damnjanovic et al.
2012/0076025 A1* 3/2012  Barbieri ................ H04L 5/0023
                                                  370/252
(Continued)

FOREIGN PATENT DOCUMENTS

JP   2012-004924 A      1/2012
KR   10-2011-0007197 A  1/2011
(Continued)

OTHER PUBLICATIONS

International Search Report of PCT/KR2013/005820 dated Jul. 26, 2013.

*Primary Examiner* — Ajit Patel
(74) *Attorney, Agent, or Firm* — Rabin & Berdo, P.C.

(57) ABSTRACT

There is provided a method for removing interference between a femto-cell and a macro-cell, comprising: allocating communication resources to a plurality of femto-cell user devices; receiving uplink signals between a plurality of the macro-cell user devices and a macro-cell base station from the plurality of the macro-cell user devices; detecting a high interference indicator (HII) from the uplink signals; deciding a macro-cell user device, which has transmitted the high interference indicator, as an interference subject user device; extracting channel state information (CSI) from the uplink signal received from the interference subject user device; and changing and allocating the communication resource allocated to the femto-cell user device based on the extracted channel state information.

16 Claims, 7 Drawing Sheets

(51) Int. Cl.
  *H04W 16/10*  (2009.01)
  *H04W 84/04*  (2009.01)

(56) References Cited

U.S. PATENT DOCUMENTS

| | | | | |
|---|---|---|---|---|
| 2012/0093012 | A1* | 4/2012 | Pedersen | H04B 7/0626 370/252 |
| 2013/0182583 | A1* | 7/2013 | Siomina | H04W 24/10 370/252 |
| 2013/0182789 | A1* | 7/2013 | Ko | H04L 1/0026 375/267 |
| 2013/0225188 | A1* | 8/2013 | Seo | H04J 11/005 455/450 |
| 2013/0295949 | A1* | 11/2013 | Seo | H04J 11/005 455/452.1 |
| 2014/0029565 | A1* | 1/2014 | Kim | H04L 5/001 370/329 |

FOREIGN PATENT DOCUMENTS

| KR | 10-2011-0071358 A | 6/2011 |
|---|---|---|
| KR | 10-2012-0070141 A | 6/2012 |

\* cited by examiner

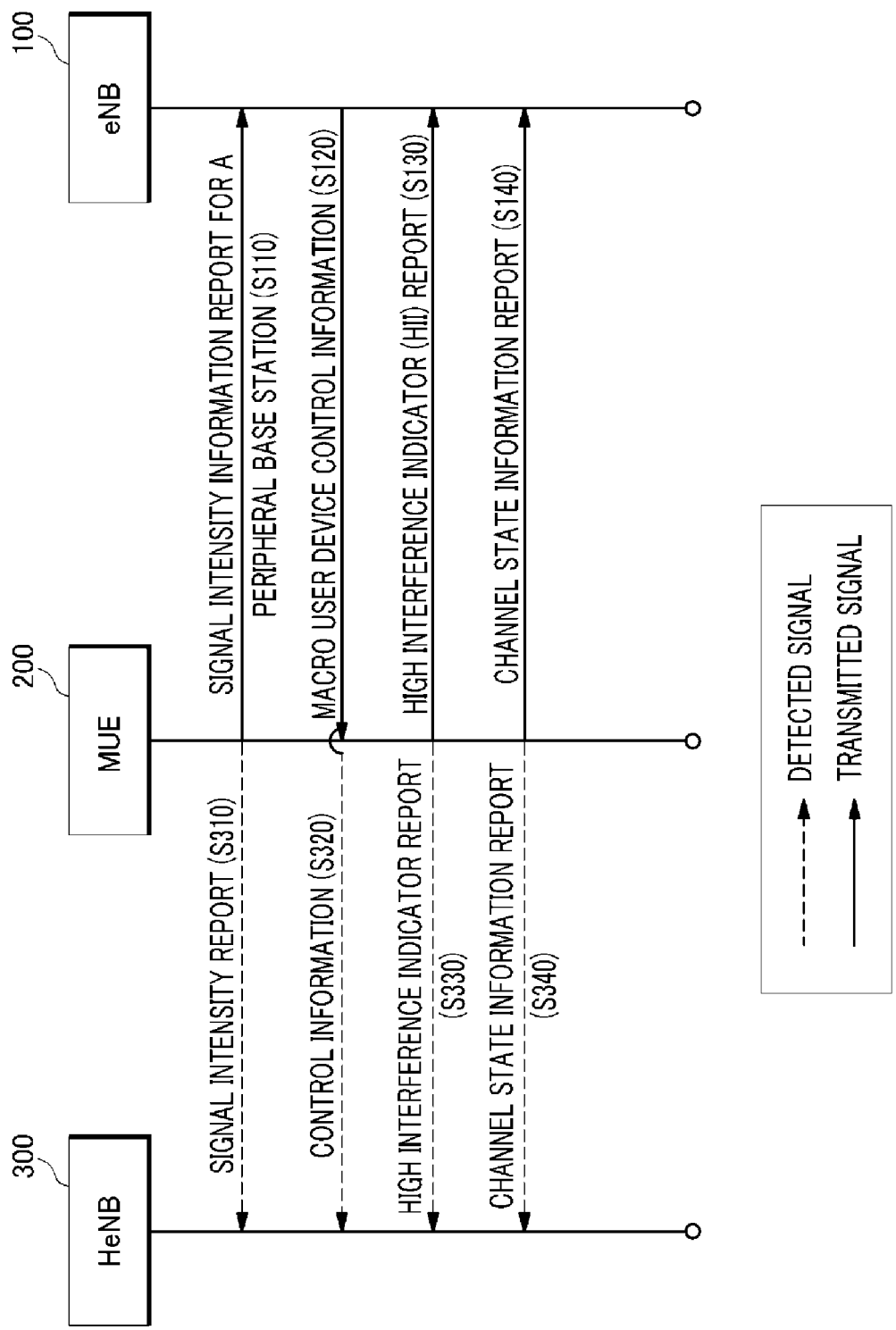

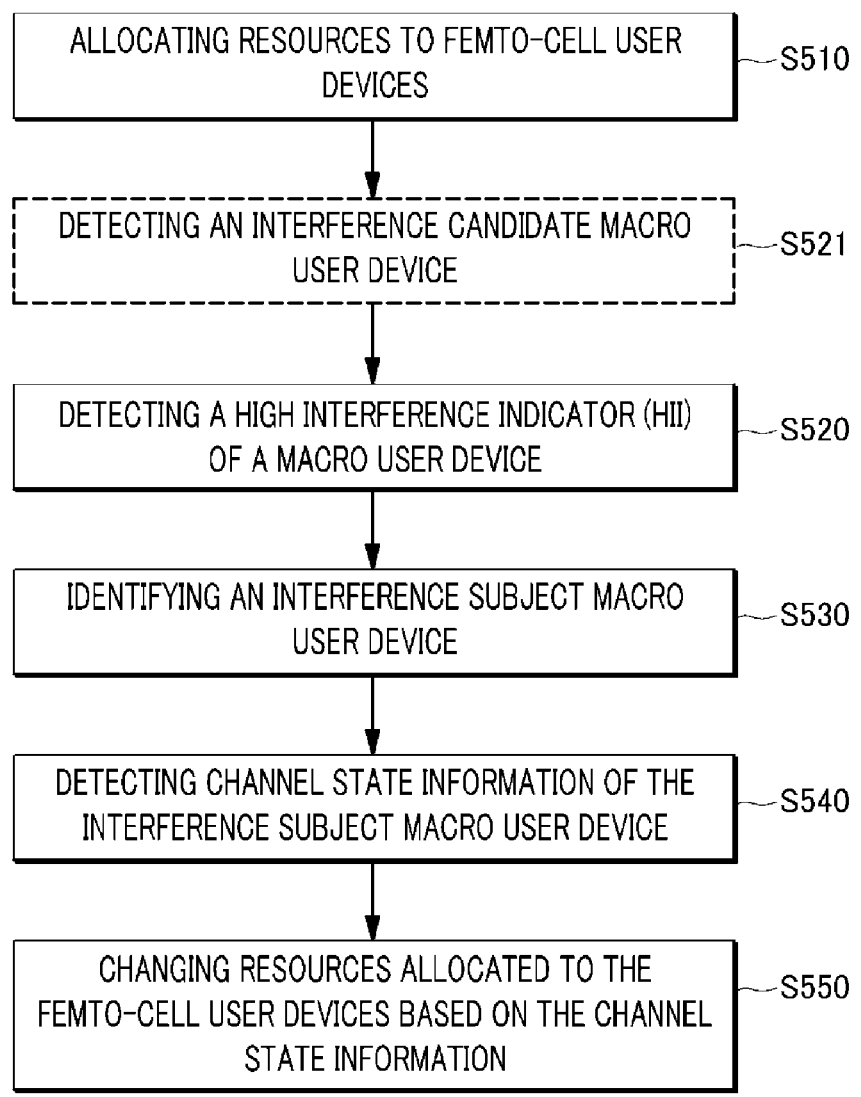

APPARATUS AND METHOD FOR MITIGATION/REMOVAL OF INTERFERENCE BETWEEN MACRO-CELL AND FEMTO-CELL

CROSS-REFERENCE TO RELATED APPLICATION

This application claims the benefit of Korean Patent Application No. 10-2012-0071390 filed on Jun. 29, 2012 and PCT Patent Application No. PCT/KR2013/005820 filed on Jul. 1, 2013, the entire disclosures of which are incorporated herein by reference.

BACKGROUND

The embodiments described herein pertain generally to a apparatus and a method for mitigating or removing interference occurring between a macro-cell and a femto-cell.

In order to improve a capacity of a radio communication system, it is the most efficient to locate a transmitting end and a receiving end to be close to each other, and especially, a femto-cell technology is very efficient and effective in costs.

Since the femto-cell technology has potential advantages in view of improvement of an indoor area scope, energy efficiency and costs, it has been applied to a high-speed radio communication system. In addition, the femto-cell has been adopted as one of main functions of the LTE system, and an LTE femto-cell is advantageous in that it can use all bands defined in 3GPP and does not require a dedicated frequency band. For this reason, however, fatal co-channel interference between the macro-cell and the femto-cell may be caused.

Specifically, in a two-layer network, substantive interference problems may occur for the reason of scalability, security and limited availability of a backhaul bandwidth. In other words, using a macro-cell base station and a femto-cell base station on an identical spectrum is far more effective in view of social communication infrastructures or availability of a spectrum, but in this case, there is a problem because the two layers share a channel so that serious interference may occur in the shared channel. In recent, there have been suggested many methods to resolve the problem of interference that may occur in the network allowing co-existence of a femto-cell and a macro-cell.

Meanwhile, the primary demand for the macro-cell is related to enabling a user to conduct communication anytime, anywhere, and even during movement without a separate device, and many users receive a communication service from each macro-cell base station. Accordingly, it is desirable to preferentially secure a communication capacity of the macro-cell, compared to the femto-cell. That is, even if inter-layer interference exists with respect to the femto-cell, a minimum target SINR of a macro-cell user should be met.

To this end, it needs to be identified how much power in the femto-cell should be reduced to enable the macro-cell user to meet the target SINR, and an interference mitigation/removal method, which spends less time during processing of an interference mitigation/removal algorithm and has simple complexity to minimize latency as much as possible, is necessary. In addition, upon implementation of interference mitigation/removal, the process should be able to be combined with other resource managements like power and sub-channel assignment.

Accordingly, for mitigation/removal of interference in the two-layer network, the femto-cell should be able to conduct various measurements to offer sufficient information to the femto-cell, and simultaneously, maintain the coverage of the femto-cell.

For example, current LTE technology reports suggest various options for methods for information exchange between the macro-cell and the femto-cell. The methods include a method for information exchange between the macro-cell and the femto-cell through direct broadcasting between base stations, an information exchange method using broadcasting between a macro-cell base station and a femto-cell base station through a user device, a method for information exchange between a macro-cell base station and a femto-cell base station through X2-based interface as signaling protocol between base stations, a method for information exchange between a macro-cell base station and a femto-cell base station through S1-based interface as signaling protocol between a base station and a gateway, and others.

In this regard, Korean Patent Application No. 10-2009-0127908 (Method and Apparatus for Control of Interference of Base Station) suggests a method and an apparatus for controlling interference of a femto-cell base station, by converting an X2 interference control message used in an X2 interface into a format according to a protocol of an S1 interface to control interference occurring in a femto-cell environment having no X2 interface, so as to use a conventionally used X2 interference control message without newly defining an interface control message in the S1 interface.

DISCLOSURE OF THE INVENTION

Problems to be Solved by the Invention

In view of the foregoing problems, example embodiments provide a device and a method for mitigating/removing interference, which remove interference to a shared channel between a macro-cell and a femto-cell and are capable of handling the interference without changing a macro-cell system resource.

Means for Solving the Problems

In accordance with a first aspect (example embodiment) of the present disclosure, there is provided a femto-cell base station, comprising: a resource allocating unit that allocates a communication resource to a femto-cell user device; an uplink signal receiving unit that receives uplink signals between a plurality of macro-cell user devices and a macro-cell base station from the plurality of the macro-cell user devices; an interference indicator extracting unit that detects a high interference indicator (HII) of each of the plurality of the macro-cell user devices from the received uplink signals; an interference subject identifying unit that decides an interference subject user device among the plurality of the macro-cell user devices based on the detected high interference indicators; a channel state information extracting unit that extracts channel state information (CSI) of the interference subject user device from the received uplink signals; and an interference removal controller that controls the resource allocating unit to change a communication resource allocated to the femto-cell user device based on the extracted channel state information.

Especially, the interference removal controller may replace a channel state information of the femto-cell user device with the extracted channel state information, and may control the resource allocating unit based on the replaced channel state information.

Especially, the femto-cell base station may further comprise a downlink signal receiving unit that receives downlink signals between the macro-cell base station and the plurality of the macro-cell user devices from the macro-cell base station; and a resource allocation information extracting unit that extracts resource allocation information indicating information of the communication resource allocated to the plurality of the macro-cell user devices based on the received downlink signals. Herein, the interference removal controller may control the resource allocating unit to change the communication resource allocated to the femto-cell user device based on the extracted channel state information and the extracted resource allocation information.

Especially, the femto-cell base station may further comprise an interference candidate managing unit that extracts a signal intensity report by the macro-cell user devices to the femto-cell base station from the uplink signals, and selects the macro-cell user device, of which signal intensity according to the signal intensity report corresponds to preset reference intensity or higher, as an interference subject candidate. Herein, the interference indicator extracting unit may extract the high interference indicator from the uplink signal of the interference subject candidate.

Herein, the interference candidate managing unit may extract a reference signal received power (RSRP) as the signal intensity.

Herein, the communication resource may include at least one of a physical resource block (PRB) and a transmit power.

Herein, the interference removal controller may control the resource allocating unit to change the physical resource block allocated to the femto-cell user device based on the physical resource block allocated to the interference subject user device.

Herein, the interference removal controller may control the resource allocating unit to reduce the transmit power allocated to the femto-cell user device based on the transmit power allocated to the interference subject user device.

In accordance with a second aspect (another example embodiment) of the present disclosure, there is provided a method for removing interference between a femto-cell and a macro-cell through a femto-cell base station, comprising: allocating communication resources to a plurality of femto-cell user devices; receiving uplink signals between a plurality of the macro-cell user devices and a macro-cell base station from the plurality of the macro-cell user devices; detecting a high interference indicator (HII) from the uplink signals; deciding a macro-cell user device, which has transmitted the high interference indicator, as an interference subject user device; extracting channel state information (CSI) from the uplink signal received from the interference subject user device; and changing and allocating the communication resource allocated to the femto-cell user device based on the extracted channel state information.

Especially, the changing and allocating of the communication resource allocated to the femto-cell user device may replace a state information of the femto-cell user device with the extracted channel state information, and may allocate the communication resource based on the replaced channel state information.

Especially, the method for removing interference between a femto-cell and a macro-cell may further comprise receiving downlink signals between the macro-cell user devices and the macro-cell base station from the macro-cell base station; and extracting resource allocation information indicating information of a communication resource allocated to the plurality of the macro-cell user devices based on the received downlink signals, prior to the changing and allocating of the communication resource allocated to the femto-cell user device. Herein, the changing and allocating of the communication resource allocated to the femto-cell user device may change and allocate the communication resource allocated to the femto-cell user devices based on the extracted channel state information and the extracted resource allocation information.

Especially, the method for removing interference between a femto-cell and a macro-cell may further comprise extracting a signal intensity report included in the uplink signal to the femto-cell base station; and selecting a macro-cell user device, of which signal intensity according to the signal intensity report corresponds to preset reference intensity or higher, as an interference subject candidate, prior to the detecting of the high interference indicator. Herein, the detecting of the high interference indicator may detect the high interference indicator from the uplink signal of the interference subject candidate.

Herein, the signal intensity may be a reference signal received power (RSRP). Herein, the communication resource may include at least one of a physical resource block (PRB) and a transmit power.

Herein, the changing and allocating of the communication resource allocated to the femto-cell user device may change the physical resource block allocated to the femto-cell user device based on the physical resource block allocated to the interference subject user device.

Herein, the changing and allocating of the communication resource allocated to the femto-cell user device may change the transmit power allocated to the femto-cell user device to be reduced based on the transmit power allocated to the interference subject user device.

Effect of the Invention

In accordance with the example embodiments, since a femto-cell detects uplink and downlink signals of a macro-cell to use the signals for removal of interference, central control is unnecessary, and there is no need to correct or change a system operation method, like a resource allocation mechanism, which is being originally used in a macro-cell system.

The example embodiments are efficient since separate control signal exchange between a macro-cell and a femto-cell is unnecessary, and advantageous in that the femto-cell can process removal of dynamic interference according to actual time based on the uplink and downlink signals of the macro-cell.

Furthermore, in accordance with the example embodiments, since the interference removal processing is implemented by discriminating acceptable interference and serious interference with respect to a shared channel between a macro-cell and a femto-cell, the femto-cell itself can efficiently use the shared channel.

BRIEF DESCRIPTION OF THE DRAWINGS

FIG. 4 is a call processing procedure view showing a method allowing a femto-cell base station to detect a communication link signal of a macro-cell in accordance with an example embodiment.

FIG. 5 is a flow chart showing an interference removing method in accordance with an example embodiment.

DETAILED DESCRIPTION

Figure 1:
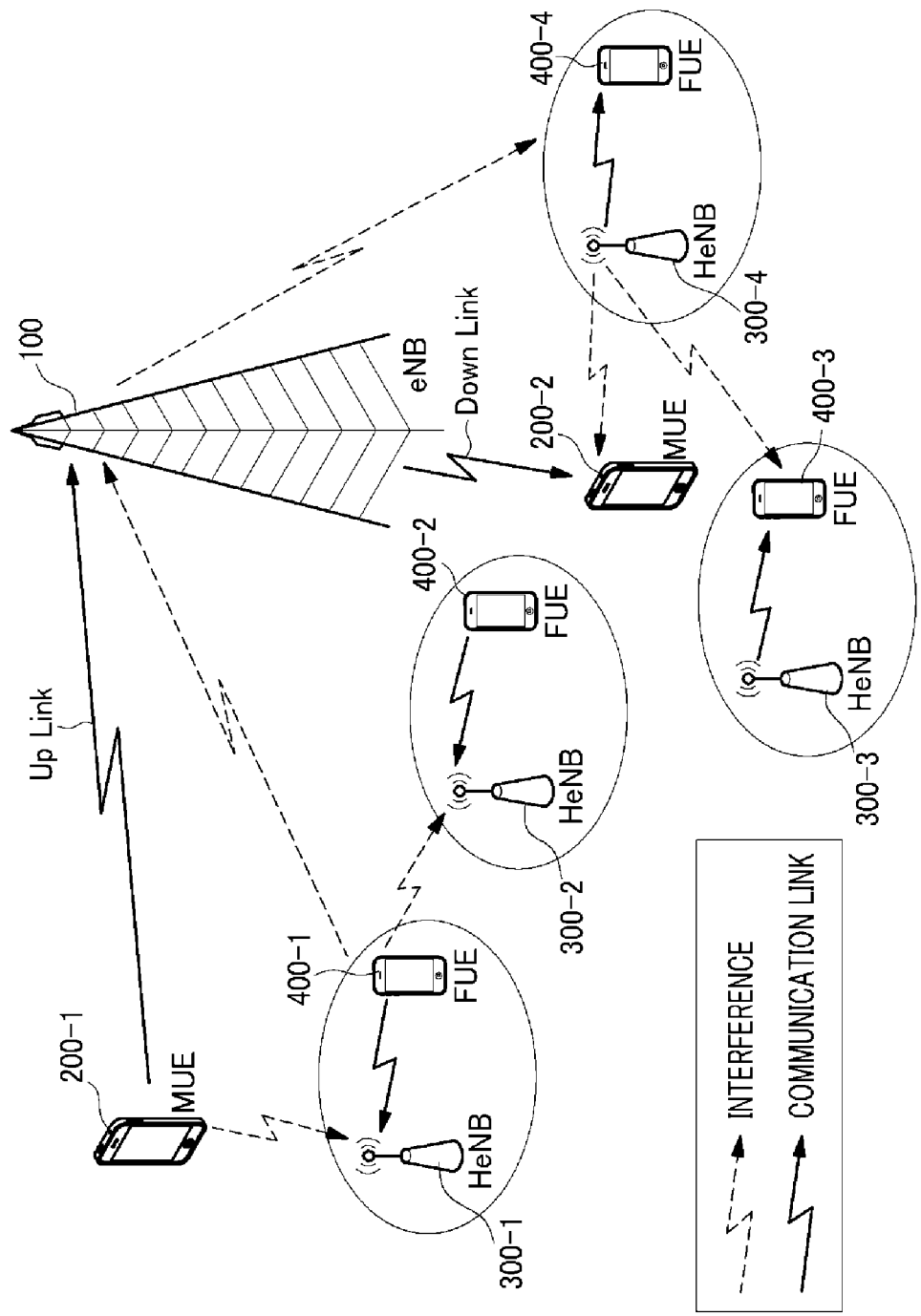
FIG. 1 is a configuration view showing configuration of a radio communication system, to which example embodiments are applied.

Hereinafter, example embodiments will be described in detail with reference to the accompanying drawings so that inventive concept may be readily implemented by those skilled in the art. However, it is to be noted that the present disclosure is not limited to the example embodiments, but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. Further, the term "comprises or includes" and/or "comprising or including" means that one or more other components, steps, operations, and/or the existence or addition of elements are not excluded in addition to the described components, steps, operations and/or elements.

FIG. 1 is a configuration view showing configuration of a radio communication system, to which example embodiments are applied.

The radio communication system, to which example embodiments are applied, may be WCDMA, CDMA 2000, WiMAX, LTE, or others, or a radio communication system using an orthogonal frequency division multiplex (OFDM) communication method.

As illustrated in FIG. 1, the radio communication system, to which example embodiments are applied, is a communication environment, in which a macro-cell and a femto-cell coexist, communication links are formed between a macro-cell base station (eNB) 100 and a multiple number of macro-cell user devices (MUE) 200-1, 200-2 (collectively, referred-to as "200"), and communication links are formed between a femto-cell base station (HeNB) 300-1, 300-2, 300-3, 300-4 (collectively, referred-to as "300") and a multiple number of femto-cell user devices (FUE) 400-1, 400-2, 400-3, 400-4 (collectively, referred-to as "400").

In this case, the communication link of the macro-cell and the communication link of the femto-cell have an interference effect on each other, and especially, when the macro-cell and the femto-cell share and use a co-channel resource, high interference occurs in the shared channel.

Accordingly, the interference removing device 300 in accordance with an example embodiment detects uplink signals and downlink signals, which are transmitted and received between the macro-cell user devices 200 and the macro-cell base station 100, and changes allocation of communication resources to the femto-cell user devices 400 based on the detected uplink and downlink signals to remove (or mitigate) the interference to the shared channel.

For reference, the interference removing device 300 in accordance with an example embodiment may be included as one component in the femto-cell base station 300, may be the femto-cell base station 300 itself, or may be an independent component connected to each femto-cell base station 300 within a radio communication system. Hereinafter, for convenience in description, the femto-cell base station 300 and the interference removing device 300 are described as an identical component.

Figure 2:
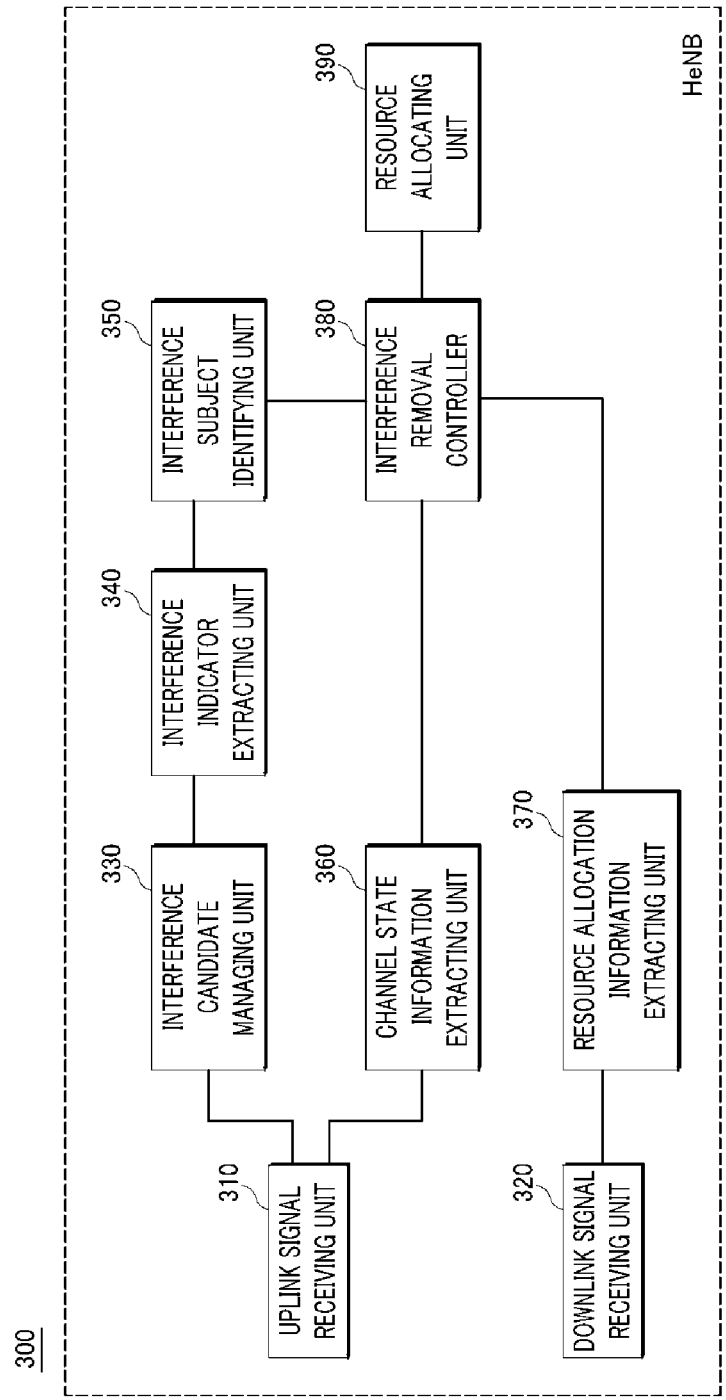
FIG. 2 is a block diagram showing configuration of an interference removing device in accordance with an example embodiment.

FIG. 2 is a block diagram showing configuration of the interference removing device in accordance with an example embodiment.

As illustrated in FIG. 2, the interference removing device (i.e., the femto-cell base station, HeNB) 300 includes an uplink signal receiving unit 310, a downlink signal receiving unit 320, an interference candidate managing unit 330, an interference indicator extracting unit 340, an interference subject identifying unit 350, a channel state information extracting unit 360, a resource allocation information extracting unit 370, an interference removal controller 380, and a resource allocating unit 390.

The uplink signal receiving unit 310 receives uplink signals between the multiple number of the macro-cell user devices 200 and the macro-cell base station 100 from the multiple number of the macro-cell user devices 200, and transmits the received uplink signals to the interference candidate managing unit 330 and the channel state information extracting unit 360.

Specifically, the method allowing the uplink signal receiving unit 310 to receive the uplink signals of the macro-cells is described with reference to FIG. 4.

FIG. 4 is a signal flow view showing the method allowing the femto-cell base station to detect communication link signals of the macro-cells in accordance with an example embodiment.

As illustrated in FIG. 4, a transmitted signal that the macro-cell user devices (MUE) 200 transmit to the macro-cell base station (eNB) 100 is detected in the femto-cell base station (HeNB) 300 at the time of the transmission.

Specifically, the macro-cell user devices 200 report information of signal intensity for peripheral base stations (including peripheral femto-cell base stations) to the macro-cell base station 100 (S110), and at this time, the femto-cell base station 300 receives the report of the signal intensity transmitted by the macro-cell user devices 200 (S310). For reference, the macro-cell user devices 200 may report reference signal received power (RSRP) as the signal intensity.

The macro-cell user devices 200 transmit a high interference indicator (HII) report for a base station, which is currently having an high interference effect on the devices themselves, based on the signal intensity for the peripheral base stations (S130), and at this time, the femto-cell base station 300 receives the high interference indicator report transmitted by the macro-cell user devices 200 (S330).

In addition, the macro-cell user devices 200 estimate the channel state based on a certain signal received from the macro-cell base station 100, and generates channel state information (CSI) according to the estimated channel state to report the information to the macro-cell base station 100 (S140). At this time, the femto-cell base station 300 receives the channel state information transmitted by the macro-cell user devices 200 (S340).

The signal intensity report, the high interference indicator report, and the channel state information report by the macro-cell user devices 200 as described are received as uplink signals in the uplink signal receiving unit 310 of the femto-cell base station 300.

Returning to FIG. 2, the downlink signal receiving unit 320 receives downlink signals between the macro-cell base station 100 and the multiple number of the macro-cell user devices 200 from the macro-cell base station 100. And, the downlink signal receiving unit 320 delivers the received downlink signals to the resource allocation information extracting unit 370.

Specifically, as illustrated in FIG. 4, the macro-cell base station (eNB) 100 transmits control information for each of a multiple number of registered macro-cell user devices (MUE) 200 (S120), and at this time, the femto-cell base station (HeNB) 300 receives the control information of each of the macro-cell user devices 200 (S320).

At this time, the control information transmitted by the macro-cell base station 100 is received as downlink signals in the downlink signal receiving unit 320 of the femto-cell base station 300. For reference, the control information may include a physical resource block (PRB) and a time slot.

Meanwhile, FIG. 4 illustrates that the macro-cell user devices 200 sequentially transmit and receive the signal intensity report, the control information, the high interference indicator report, and the channel state information report, but the sequence of transmitting or receiving the reports and information is not limited.

Returning to FIG. 2, the interference indicator extracting unit 340 detects a high interference indicator (HII) of each of the multiple number of the macro-cell user devices 200 from the uplink signals.

Specifically, the interference indicator extracting unit 340 detects the high interference indicators reported by the macro-cell user devices 200 for the devices themselves (i.e., corresponding femto-cell base stations) from the uplink signals received through the uplink signal receiving unit 310.

Based on the extracted high interference indicators, the interference subject identifying unit 350 identifies a macro-cell user device 200, in which serious interference occurs within a shared channel, among the multiple number of the macro-cell user devices 200 to decide the device as an interference subject user device.

Meanwhile, it has been described that the interference indicator extracting unit 340 receives the uplink signals directly from the uplink signal receiving unit 310 to detect the high interference indicators.

However, as illustrated in FIG. 2, in the interference removing device 300 in accordance with an example embodiment, the uplink signal receiving unit 310 may provide the uplink signals to the interference candidate managing unit 330 such that a candidate user device, which is likely to be a subject of interference, is selected, and the interference indicator extracting unit 340 may detect a high interference indicator from an uplink signal of the selected interference subject candidate user device.

Specifically, the interference candidate managing unit 330 extracts the signal intensity report by the macro-cell devices 200 to the corresponding femto-cell base station 300 from the uplink signals, and selects and manages a macro-cell user device (hereinafter, referred-to as an "interference subject candidate"), which is likely to be a subject of interference, based on signal intensity information included in the signal intensity report.

In this case, the interference candidate managing unit 330 may select a macro-cell user device that has reported signal intensity corresponding to present reference intensity or higher as the interference subject candidate from the detected signal intensity, and store and manage at least one selected interference subject candidate in a list. In this case, in accordance with another example embodiment, the interference subject candidate may not be selected.

Accordingly, the interference removing device 300 in accordance with an example embodiment is efficient since it can identify occurrence of interference only for the macro-cell user devices, in which interference to the corresponding femto-cell base station 300 is highly likely to occur, without detecting the high interference indicators from the uplink signals of all the peripheral macro-cell user devices.

The channel state information extracting unit 360 extracts channel state information (CSI) of the interferer subject user device from the uplink signals received through the uplink signal receiving unit 301. The channel state information extracting unit 360 transmits the extracted channel state information to the interference removal controller 380.

The resource allocation information extracting unit 370 extracts resource allocation information (e.g., control information) indicating information of communication resources allocated to the multiple number of the macro-cell user devices 200 based on the downlink signals received through the downlink signal receiving unit 320. The resource allocation information extracting unit 370 transmits the extracted resource allocation information for the macro-cell user devices 200 to the interference removal controller 380.

For reference, the resource allocation information extracting unit 370 may extract resource allocation information of all the peripheral macro-cell user devices 200, but may extract only resource allocation information of the macro-cell user device 200, which corresponds to the interference subject candidate selected through the interference candidate managing unit 330.

The resource allocating unit 390 allocates communication resources to the multiple number of the femto-cell user devices 400. For reference, the resource allocating unit 390 allocates communication resources to the multiple number of the femto-cell user devices 400 for a communication service without considering interference that may occur in a shared channel with the macro-cell user devices 200, while allocating the communication resource by changing communication resources previously allocated according to control of the interference removal controller 380. In this case, the communication resources include at least one of a physical resource block (PRB) and a transmit power.

The interference removal controller 380 controls the resource allocating unit 390 based on the extracted channel state information to change the communication resources previously allocated to the femto-cell user devices 400. In this case, the interference removal controller 380 may change the communication resources previously allocated to the femto-cell user devices 400 based on the extracted channel state information and the extracted resource allocation information.

Specifically, the interference removal controller 380 identifies a channel (i.e., a shared channel), in which serious interference occurs between the macro-cell and the femto-cell, based on the resource allocation information of the decided interference subject user device (i.e., a macro-cell user device that has transmitted a high interference indicator). The interference removal controller 380 changes and allocates the communication resources previously allocated to the femto-cell user devices 400, which are using the corresponding shared channel.

In this case, the interference removal controller 380 replaces a channel state information of the femto-cell user devices 400 with the extracted channel state information, which are using the corresponding shared channel, and controls the resource allocating unit 390 to reallocate communication resources based on the replaced channel state information.

For reference, the method allowing the interference removal controller 380 to replace the channel state information of the interference subject user devices with the channel state information of the femto-cell user devices 400 is described with reference to FIG. 3.

Figure 3A:
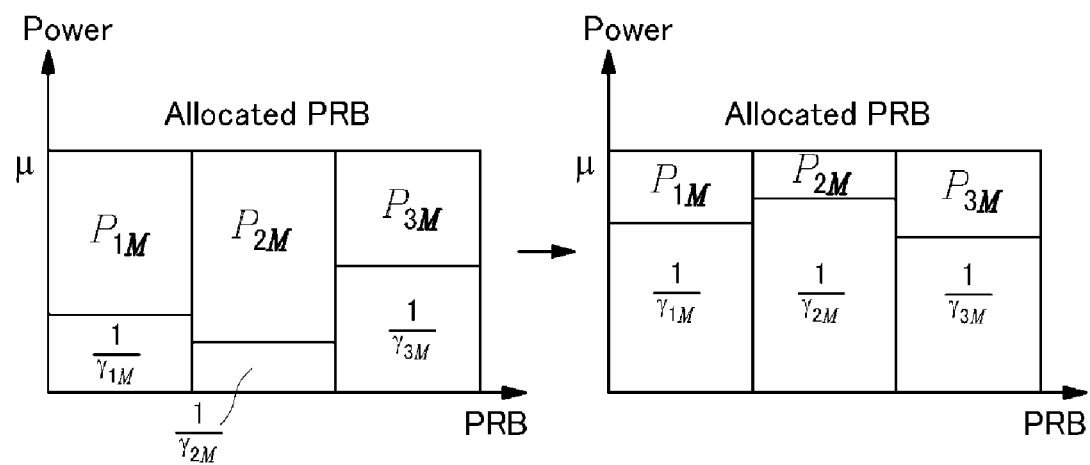
FIG. 3A is a graph showing a power allocation method for interference removal in accordance with an example embodiment.
Figure 3B:
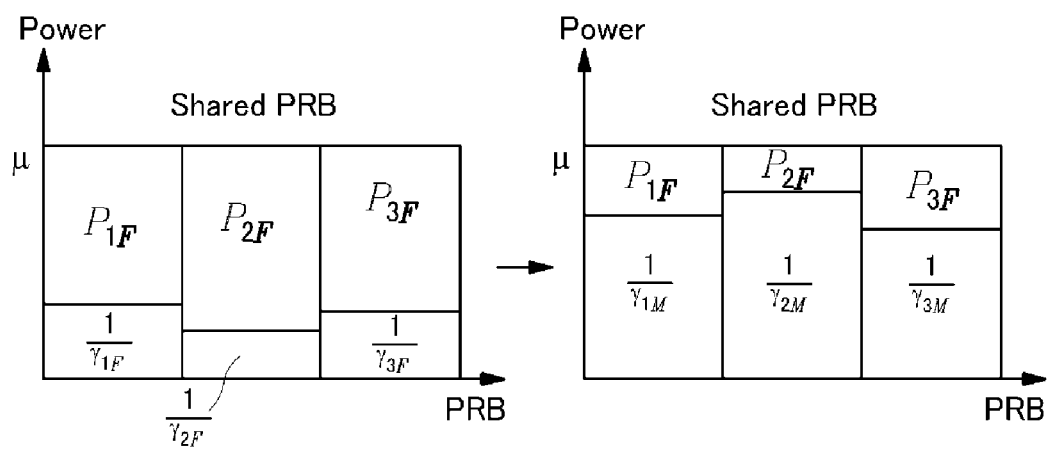
FIG. 3B is a graph showing a power allocation method for interference removal in accordance with an example embodiment.
Figure 3C:
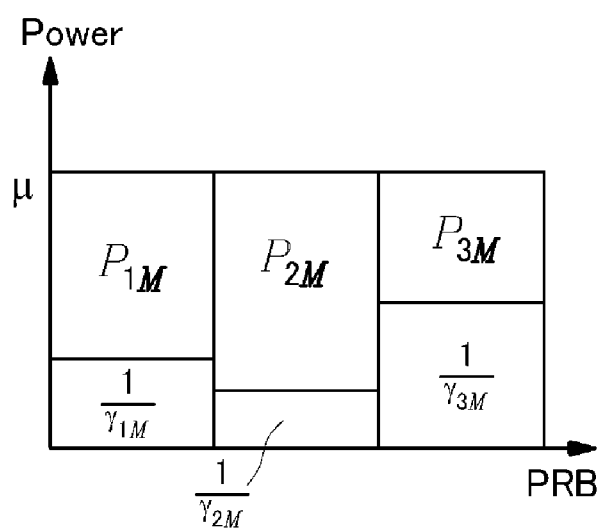
FIG. 3C is a graph showing a power allocation method for interference removal in accordance with an example embodiment.

FIG. 3A to 3C are graphs showing a power allocation method for interference removal in accordance with an example embodiment, respectively. Here, $\gamma_{iM}$ is an SINR value in the macro-cell user devices, $P_{iM}$ is a transmit power of the macro-cell base station per PRB, $\gamma_{iF}$ is an SINR value in the femto-cell user devices, and $P_{jF}$ is a transmit power of the femto-cell base station per PRB.

A right and left graphs of FIG. 3A show the channel state when the macro-cell user devices 200 are affected by the femto-cell, and when the macro-cell user devices 200 are not affected by the femto-cell, respectively. It is identified that the channel state is more deteriorated when the macro-cell user devices 200 are affected by interference by the femto-cell, than when the macro-cell user devices 200 are not affected by interference by the femto-cell.

A right and left graphs of FIG. 3B show changing and applying allocation of the transmit power when the femto-cell user devices 400 do not consider the interference affecting the macro-cell, and when the femto-cell user devices 400 consider the interference affecting the macro-cell, respectively.

In this case, FIG. 3B shows replacing the channel state [i.e., indicated in the left graph of FIG. 3B] according to the transmit power previously allocated to the femto-cell user devices 400 with the channel state [i.e., indicated in the right graph of FIG. 3A] of the macro-cell user devices 200 using the shared channel.

Accordingly, it is identified that by replacing the channel state of the femto-cell user devices 400 using the shared channel with the channel state of the macro-cell user devices 200 (e.g., applying a "water-filling method"), the interference of the channel state of the macro-cell user devices 200 is mitigated as shown in FIG. 3C.

Returning to FIG. 2, the interference removal controller 380 may change and allocate the communication resources of the femto-cell user devices 400, which are using the shared channel, based on the resource allocation information of the interference subject user device.

Specifically, the interference removal controller 380 controls the resource allocating unit 390 to change the physical resource block previously allocated to the femto-cell user devices 400, which are using the shared channel, into another physical resource block based on the physical resource block allocated to the interference subject user device.

In addition, the interference removal controller 380 controls the resource allocating unit 390 to reduce the transmit power previously allocated to the femto-cell user devices 400, which are using the shared channel, based on the transmit power allocated to the interference subject user device.

As described above, by changing and allocating the communication resources to the femto-cell user devices 400, interference occurring in the shared channel between the femto-cell and the macro-cell may be removed or avoided.

Hereinafter, the method for removing interference between the femto-cell and the macro-cell through the femto-cell base station in accordance with an example embodiment is described in detail with reference to FIG. 5.

FIG. 5 is a flow chart showing the method for removing interference in accordance with an example embodiment.

First, a communication resource is allocated to at least one femto-cell user device 400, which is connected to the femto-cell base station 300 to receive a communication service (S510).

For reference, the communication resource includes at least one of the physical resource block and the transmit power.

In the state that the communication resources are allocated to the femto-cell user devices 400, a high interference indicator (HII), which is generated from at least one of the macro-cell user devices 200 upon the communication service for each of the macro-cell and the femto-cell, is detected (S520).

In this case, the high interference indicator may be extracted from the uplink signals transmitted by the macro-cell user devices 200 to the macro-cell base station 100.

Thereafter, the macro-cell user device 200 that has transmitted the high interference indicator is decided as the interference subject user device (S530).

Next, channel state information of the interference subject user device is detected (S540), and the communication resources previously allocated to the femto-cell user devices 400 are changed and allocated based on the detected channel state information (S550).

Specifically, control information (i.e., resource allocation information) is extracted from the downlink signals transmitted by the macro-cell base station 100 to the interference subject user device to identify the resource allocation information, and the communication resources are changed and allocated to the femto-cell user devices 400, which are using a shared channel according to the identified resource allocation information.

In this case, the communication resources for the femto-cell user devices may be changed and allocated by changing the physical resource block of the communication resources of the femto-cell user devices for the shared channel into another physical resource block, lowering the previously allocated transmit power, or replacing the channel state information of the femto-cell user devices with the channel state information of the interference subject user device.

Meanwhile, although the method for detecting a high interference indicator from the uplink signals of all the macro-cells to be received has been described, it may be possible to detect an interference candidate user device, in which interference is likely to occur by the femto-cell, from the macro-cell user devices, and then, detect a high interference indicator for the interference candidate user devices, prior to S520.

Specifically, a received signal intensity report by the macro-cell user devices to a peripheral base station is detected from the uplink signals of the macro-cells, such that the macro-cell user device, which has reported signal intensity corresponding to preset reference intensity or higher for the device itself, is detected as the interference candidate user device (S521).

Thereafter, the processes following S520 may be implemented for the detected interference candidate user device.

That is, the femto-cell base station 300 does not detect uplink/downlink signals for all the macro-cell user devices 200, and may detect uplink/downlink signals only for at least one interference candidate user device, in which interference is highly likely to occur, so that interference removal (or mitigation) for a shared channel can be efficiently implemented.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A femto-cell base station, comprising:
a resource allocating unit that allocates a communication resource to a femto-cell user device;
an uplink signal receiving unit that receives uplink signals which are transmitted and received between a plurality of macro-cell user devices and a macro-cell base station from the plurality of the macro-cell user devices;
an interference indicator extracting unit that detects a high interference indicator (HII) of each of the plurality of the macro-cell user devices from the received uplink signals;
an interference subject identifying unit that decides an interference subject user device among the plurality of the macro-cell user devices based on the detected high interference indicators;
a channel state information extracting unit that extracts channel state information (CSI) of the interference subject user device from the received uplink signals; and
an interference removal controller that controls the resource allocating unit to change the communication resource allocated to the femto-cell user device based on the extracted channel state information of the interference subject user device.

2. The femto-cell base station of claim 1,
wherein the interference removal controller replaces a channel state information of the femto-cell user device with the extracted channel state information, and controls the resource allocating unit based on the replaced channel state information.

3. The femto-cell base station of claim 1, further comprising:
a downlink signal receiving unit that receives downlink signals between the macro-cell base station and the plurality of the macro-cell user devices from the macro-cell base station; and
a resource allocation information extracting unit that extracts resource allocation information indicating information of the communication resource allocated to the plurality of the macro-cell user devices based on the received downlink signals;
wherein the interference removal controller controls the resource allocating unit to change the communication resource allocated to the femto-cell user device based on the extracted channel state information and the extracted resource allocation information.

4. The femto-cell base station of claim 1, further comprising:
an interference candidate managing unit that extracts a signal intensity report by the macro-cell user devices to the femto-cell base station from the uplink signals, and selects the macro-cell user device, of which signal intensity according to the signal intensity report corresponds to preset reference intensity or higher, as an interference subject candidate,
wherein the interference indicator extracting unit extracts the high interference indicator from the uplink signal of the interference subject candidate.

5. The femto-cell base station of claim 4,
wherein the interference candidate managing unit extracts a reference signal received power (RSRP) as the signal intensity.

6. The femto-cell base station of claim 1,
wherein the communication resource includes at least one of a physical resource block (PRB) and a transmit power.

7. The femto-cell base station of claim 6,
wherein the interference removal controller controls the resource allocating unit to change the physical resource block allocated to the femto-cell user device based on the physical resource block allocated to the interference subject user device.

8. The femto-cell base station of claim 6,
wherein the interference removal controller controls the resource allocating unit to reduce the transmit power allocated to the femto-cell user device based on the transmit power allocated to the interference subject user device.

9. A method for removing interference between a femto-cell and a macro-cell through a femto-cell base station, comprising:
allocating communication resources to a plurality of femto-cell user devices;
receiving uplink signals which are transmitted and received between a plurality of the macro-cell user devices and a macro-cell base station from the plurality of the macro-cell user devices;
detecting a high interference indicator (HII) from the uplink signals;
deciding a macro-cell user device, which has transmitted the high interference indicator, as an interference subject user device;
extracting channel state information (CSI) from the uplink signal received from the interference subject user device; and
changing and allocating the communication resources allocated to the femto-cell user device based on the extracted channel state information of the interference subject user device.

10. The method for removing interference between a femto-cell and a macro-cell as claimed in claim 9,
wherein the changing and allocating of the communication resource allocated to the femto-cell user device replaces a state information of the femto-cell user device with the extracted channel state information, and allocates the communication resource based on the replaced channel state information.

11. The method for removing interference between a femto-cell and a macro-cell as claimed in claim 9, further comprising:

receiving downlink signals between the macro-cell user devices and the macro-cell base station from the macro-cell base station; and extracting resource allocation information indicating information of a communication resource allocated to the plurality of the macro-cell user devices based on the received downlink signals, prior to the changing and allocating of the communication resource allocated to the femto-cell user device, wherein the changing and allocating of the communication resource allocated to the femto-cell user device change and allocate the communication resource allocated to the femto-cell user devices based on the extracted channel state information and the extracted resource allocation information.

12. The method for removing interference between a femto-cell and a macro-cell as claimed in claim 9, further comprising:

extracting a signal intensity report included in the uplink signal to the femto-cell base station; and selecting a macro-cell user device, of which signal intensity according to the signal intensity report corresponds to preset reference intensity or higher, as an interference subject candidate, prior to the detecting of the high interference indicator, wherein the detecting of the high interference indicator detects the high interference indicator from the uplink signal of the interference subject candidate.

13. The method for removing interference between a femto-cell and a macro-cell as claimed in claim 12, wherein the signal intensity is a reference signal received power (RSRP).

14. The method for removing interference between a femto-cell and a macro-cell as claimed in claim 9, wherein the communication resource includes at least one of a physical resource block (PRB) and a transmit power.

15. The method for removing interference between a femto-cell and a macro-cell as claimed in claim 14, wherein the changing and allocating of the communication resource allocated to the femto-cell user device change the physical resource block allocated to the femto-cell user device based on the physical resource block allocated to the interference subject user device.

16. The method for removing interference between a femto-cell and a macro-cell as claimed in claim 14, wherein the changing and allocating of the communication resource allocated to the femto-cell user device change the transmit power allocated to the femto-cell user device to be reduced based on the transmit power allocated to the interference subject user device.

* * * * *